United States Patent
Kim et al.

(10) Patent No.: US 10,929,855 B1
(45) Date of Patent: Feb. 23, 2021

(54) SYSTEMS AND METHODS FOR FRAUD DETECTION IN E-COMMERCE TRANSACTIONS

(71) Applicant: COUPANG CORP., Seoul (KR)

(72) Inventors: Binna Kim, Seoul (KR); Kiyool Yoon, Seoul (KR); Byul Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/855,597

(22) Filed: Apr. 22, 2020

(51) Int. Cl.
*G06Q 30/00* (2012.01)
*G06Q 10/08* (2012.01)
*G06F 16/25* (2019.01)
*G06Q 30/06* (2012.01)
*G06Q 20/40* (2012.01)

(52) U.S. Cl.
CPC ....... *G06Q 30/0185* (2013.01); *G06F 16/252* (2019.01); *G06Q 10/083* (2013.01); *G06Q 10/087* (2013.01); *G06Q 20/407* (2013.01); *G06Q 30/016* (2013.01); *G06Q 30/0637* (2013.01)

(58) Field of Classification Search
CPC ..... G06Q 30/0601–0645; G06Q 10/087–0875
USPC .............................................. 705/26.1–27.2
See application file for complete search history.

(56) References Cited

U.S. PATENT DOCUMENTS 8,423,432 B1 * 4/2013 Padmanabhan ...... G06Q 10/087
705/28
2006/0212356 A1 * 9/2006 Lambert ................ G06Q 30/02
705/16

FOREIGN PATENT DOCUMENTS

WO   WO-2018047140 A1 *  3/2018   ............. G06Q 30/08

OTHER PUBLICATIONS

Rabinovich, E. (2004). Internet Retailing Intermediation: A Multi-level Analysis of Inventory Liquidity and Fulfillment Guarantees. Journal of Business Logistics, 25(2), 139-169. Retrieved from https://dialog.proquest.com/professional/docview/212644105?accountid=131444.*

* cited by examiner

*Primary Examiner* — Resha Desai
(74) *Attorney, Agent, or Firm* — Finnegan, Henderson, Farabow, Garrett & Dunner, LLP

(57) ABSTRACT

A system for fraud detection includes one or more processors configured to receive, over a network, an order comprising an item identifier and a customer identifier from a customer device. Consult at least one database to determine if the item associated with the item identifier is included in a virtual inventory. Determine the item is out of stock based on whether the item is included in the virtual inventory. Consult at least one database to determine whether compensation was provided to a customer account associated with the customer identifier, based on determining whether the item is out of stock. Transmit an order cancellation notification to the customer device based on the determination.

20 Claims, 5 Drawing Sheets

SYSTEMS AND METHODS FOR FRAUD DETECTION IN E-COMMERCE TRANSACTIONS

TECHNICAL FIELD

Embodiments of the present disclosure relate to systems and methods for fraud detection in e-commerce transactions. More particularly, embodiments of the present disclosure relate to enabling fraud detection to prevent exploitation of repeat compensation for low-in-stock items.

BACKGROUND

Users (e.g., online customers) often use website portals or mobile applications to order items (e.g. order food, groceries, etc.). By way of example, users order items via ecommerce websites. In a situation where the number of items available on the ecommerce websites are in a limited number (e.g. only one item available in stock, only four items available in stock). By way of example, in such situations, there may occur that multiple orders may be received and accepted within a small-time frame requesting for an item that is low in stock. In such situations, the item that has been requested in the multiple orders may go out of stock after processing of a first online order from the multiple orders. As a result, only the first order is fulfilled and the remaining of the orders are not fulfilled because the requested item has gone out of stock. Customers associated with those orders that are not fulfilled are dissatisfied and this results in a negative customer service experience and could potentially lead to customer stopping from using the ecommerce websites and thus results in loss of revenue.

Further, another issue that is not addressed by current solutions, is associated with customers fraudulently receiving compensations by purposely placing orders for items that are limited in availability (e.g. three items left in stock), to purchase all the available items, thus causing these items to go out of stock. Because of a delay between receiving an order on the e-commerce website and processing of the order at a warehouse, e-commerce websites may not be aware at the time of receiving the order, that the ordered items are not available and is out of stock and thus may confirm to the customer an acceptance of the order. The e-commerce websites may not able to fulfill these orders at the time of processing the order at the warehouse, as these items may be then determined to be out of stock at the warehouse. As a result, e-commerce websites may end up paying these customers compensations as a policy for not able to fulfill such orders upon acceptance, thus there is a need to identify such fraudulent customers and avoid financial losses for businesses.

Current solutions that are utilized for accepting multiple orders do not track item inventory and further do not provide any compensations to customers. Accordingly, current solutions are inefficient and result in negative customer experience, thus there is a need to reflect updates. Further, current solutions also do not consider any activities that may be fraudulent activities to receive compensation from ecommerce websites.

SUMMARY

In accordance with embodiments of the present disclosure, there is provided a system for fraud detection, the system comprising: a memory storing instructions; and at least one processor configured to execute the instructions to: receive, over a network, an order comprising an item identifier and a customer identifier from a customer device; consult at least one database to determine if the item associated with the item identifier is included in a virtual inventory, the virtual inventory representing an inventory of items associated with their corresponding item identifier available at an inventory warehouse; based on whether the item is included in the virtual inventory, determine the item is out of stock; based on determining whether the item is out of stock, consult at least one database to determine whether compensation was provided to a customer account associated with the customer identifier; and based on the determination, transmit an order cancellation notification to the customer device.

In accordance with embodiments of the present disclosure, there is also provided a computer implemented method for fraud detection, the method comprising: receiving, over a network, an order comprising an item identifier and a customer identifier from a customer device; consulting at least one database to determine if the item associated with the item identifier is included in a virtual inventory, the virtual inventory representing an inventory of items associated with their corresponding item identifier available at an inventory warehouse; based on whether the item is included in the virtual inventory, determining the item is out of stock; based on determining whether the item is out of stock, consulting at least one database to determine whether compensation was provided to a customer account associated with the customer identifier; and based on the determination, transmitting an order cancellation notification to the customer device.

In accordance with embodiments of the present disclosure, there is provided a system for fraud detection, the system comprising: a memory storing instructions; and at least one processor configured to execute the instructions to: receive, over a network, an order comprising an item identifier and a customer identifier from a customer device; consult at least one database to determine if the item associated with the item identifier is included in a virtual inventory, the virtual inventory representing an inventory of items associated with their corresponding item identifier available at an inventory warehouse; based on whether the item is included in the virtual inventory, determine the item is out of stock; based on determining whether the item is out of stock, consult at least one database to determine whether compensation was provided to a customer account associated with the customer identifier; and based on the determination, transmit an order cancellation notification to the customer device.

BRIEF DESCRIPTION OF DRAWINGS

The accompanying drawings, which are incorporated in and constitute a part of his specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

While the following description is directed to fraud detection in e-commerce transactions, these embodiments are made by example only. It should be appreciated that the present disclosure is not limited to the specific disclosed embodiments and details, which are exemplary only. It is further understood that one possessing ordinary skill in the art, in light of known systems and methods, would appreciate the use of the embodiments of the present disclosure for their intended purposes and benefits in any number of alternative embodiments, depending on specific design and other needs.

Figure 1:
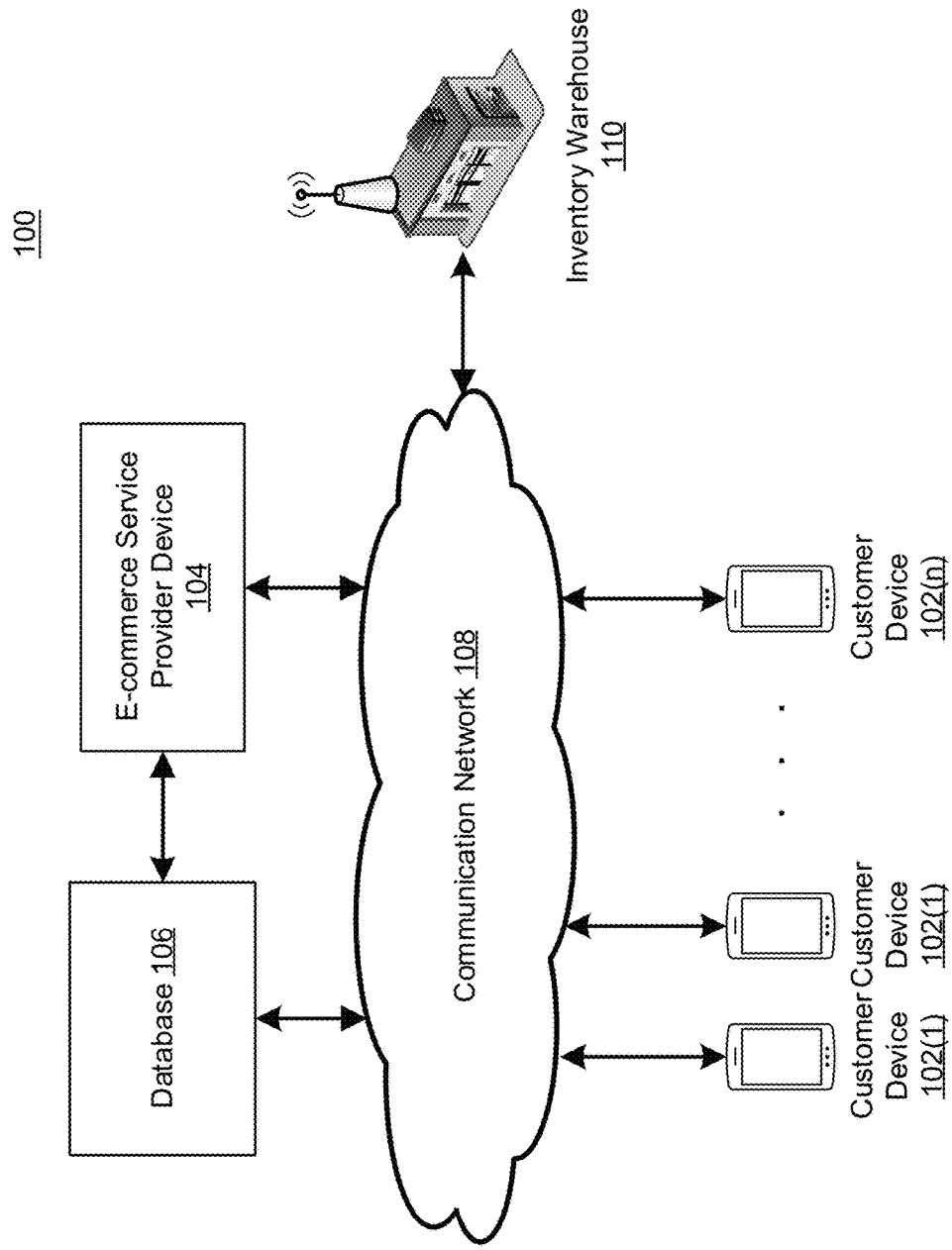
FIG. 1 is a block diagram of an exemplary system, consistent with disclosed embodiments.

FIG. 1 is a block diagram of an exemplary system 100, for performing one or more operations consistent with disclosed embodiments. In some embodiments, system 100 includes one or more customer devices 102(1), . . . 102(n), one or more e-commerce service provider devices 104, one or more database 106, one or more inventory warehouse 110, and a communication network 108. The system 100 may also include a plurality of e-commerce service provider devices 104 (not shown in drawings), a plurality of databases 106 (not shown in drawings), and a plurality of inventory warehouses 110 (not shown in drawings) communicating with each other directly and further communicating with the customer devices 102(1)-102(n), via the communication network 108. The components and arrangement of the components included in system 100 may vary. Thus, system 100 may include other components that perform or assist in the performance of one or more operations consistent with the disclosed embodiments.

As more fully described below, customer devices 102(1)-102(n), e-commerce service provider device 104, database 106, and inventory warehouse 110 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored in the memory to perform one or more operations consistent with the disclosed embodiments. Aspects of customer device(s) 102(1)-102(n), e-commerce service provider device 104, database 106, and inventory warehouse 110 may be configured to communicate with one or more other components of system 100 via communication network 108, for example. In certain aspects, users (e.g., customers) operate customer devices 102(1)-102(n), interact with one or more components of system 100 by sending and receiving communications, initiating operations, and/or providing input for one or more operations consistent with the disclosed embodiments.

E-commerce service provider device 104 may be associated with an e-commerce website that receives, processes, manages, or otherwise offers ordering or buying services or items by customers. For example, the items that may be ordered via the e-commerce website may include, prepared food, groceries, furniture, books, computers, and/or clothes, although any other type of items may also be ordered. For example, the e-commerce service provider device 104 may receive order requests from customers using customer devices 102(1)-102(n) and process the received order requests to ship items ordered in the order request to the customers associated with the order request. Upon receiving order requests from customer devices 102(1)-102(n) e-commerce service provider device 104, the e-commerce service provider device 104, transmits an order accepted request to customer devices 102(1)-102(n) that placed the order. E-commerce service provider device 104 then transmits the ordered request for processing, as explained in detail below.

Database 106 of system 100 may be communicatively coupled to e-commerce service provider device 104 directly or via communication network 108. Further, the database 106 of system 100 may be communicatively coupled to customer devices 102(1)-102(n), inventory warehouse 110, and e-commerce service provider device 104 via the communication network 108. Database 106 may include one or more memory devices that store information and are accessed and/or managed by one or more components of system 100. By way of example, database 106 may include Oracle™ databases, Sybase™ databases, or other relational databases or nonrelational databases, such as Hadoop sequence files, HBase, or Cassandra. Database 106 may include computing components (e.g., database management system, database server, etc.) configured to receive and process requests for data stored in memory devices of database 106 and to provide data from database 106.

Database 106 is configured to store, among another things, customer profile information for customers associated with the customer devices 102(1)-102(n), and a list of items available in an inventory. List of items available in the inventory may include the items that may be ordered via e-commerce websites, which may include, prepared food, groceries, furniture, books, computers, and/or clothes, although any other type of items may also be included in the inventory. Further, customer profile information in database 106 may include customer name, customers home address, pictures of customer, customer order history and/or customer phone number, although any other type of information associated with the merchant can also be included. A customer order history may include, order information associated with orders placed by customers to purchase items via e-commerce websites. Order information may include items purchased, time of purchase, cost of items, shipping information, etc., although any other type of information associated with an order for an e-commerce website may also be included.

In one aspect, e-commerce service provider device 104 may include one or more computing devices, configured to perform one or more operations consistent with disclosed embodiments as described more fully below in relation to FIGS. 4A-4B. In one aspect, e-commerce service provider device 104 may include one or more servers or server systems. E-commerce service provider device 104 may include one or more processors configured to execute software instructions stored in a memory or other storage device. The one or more processors may be configured to execute the stored software instructions to perform internet-related communication, order-based processes of receiving and processing order requests and providing compensations. The one or more computing devices of e-commerce service provider device 104 may be configured to store customer profile information and a list of items available in an inventory (e.g., in inventory warehouse 110). The one or more computing devices of e-commerce service provider device 104 may also be configured to communicate with other components of system 100 to receive and process order requests. In some embodiments, e-commerce service provider device 104 may provide one or more mobile applications, web-sites or online portals that are accessible by customer devices 102(1)-102(n) over communication network 108. The disclosed embodiments are not limited to any particular configuration of e-commerce service provider device 104.

Inventory warehouse 110 is a storage facility location (not shown in drawings) where items sold by e-commerce websites are stored. By way of example, items may include food, grocery, electronics, medicines, or furniture, although any other type of products available to shop on an e-commerce website may also be included. Database 106 stores data of all the available items and the quantity of each of the items present the inventory warehouse 110. Data of all the available items and the quantity of each of the items stored at database 106 may be updated periodically by service personnel present at the inventory warehouse 110.

Communication network 108 may comprise any type of computer networking arrangement configured to provide communications or exchange data, or both, between components of system 100. For example, communication network 108 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Communication network 108 may also include a public switched telephone network ("PSTN") and/or a wireless cellular network. Communication network 108 may be a secured network or unsecured network. In some embodiments, one or more components of system 100 may communicate directly through a dedicated communication link(s).

Customer devices 102(1)-102(n) may be one or more computing devices configured to perform one or more operations consistent with the disclosed embodiments, as described more fully below in relation to FIG. 2. Customer devices 102(1)-102(n) may execute browser or related mobile display software that displays an e-commerce website for placing orders for delivery of items, receiving orders and delivering items that are ordered, on a display included in, or connected to, customer devices 102(1)-102(n). Customer devices 102(1)-102(n) may also store and execute other mobile applications that allow customers to interact with an e-commerce website provided by the e-commerce service provider device 104.

It is to be understood that the configuration of the functional blocks of system 100 has been defined herein for convenience of description. The components and arrangement of the components included in system 100 may vary. For example, in some embodiments, system 100 may include other components that perform or assist in the performance of one or more processes consistent with disclosed methods. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
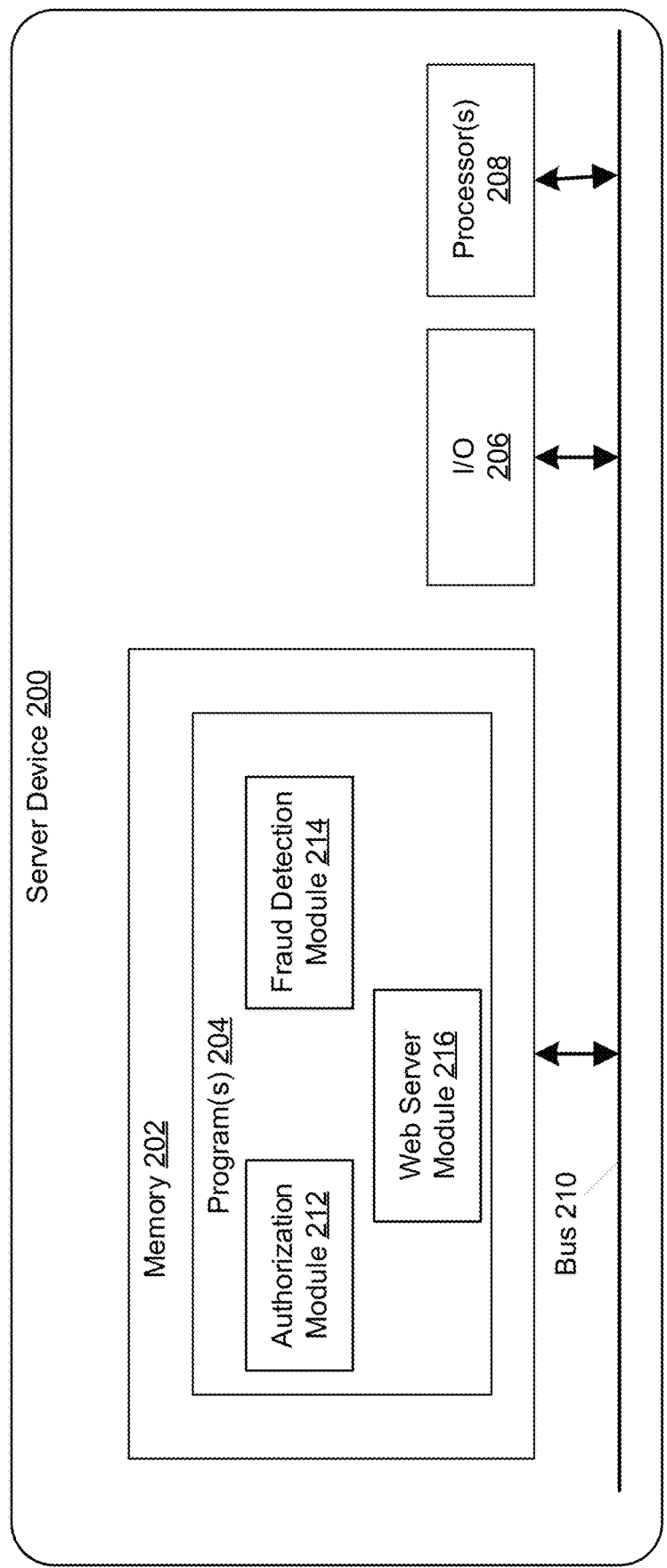
FIG. 2 is a block diagram of an exemplary server system, consistent with disclosed embodiments.

FIG. 2 shows an exemplary server device 200 consistent with the disclosed embodiments. Variations of exemplary server device 200 may constitute one or more components of e-commerce service provider device 104. In one embodiment, server device 200 includes one or more memories 202, one or more I/O devices 206, and one or more processors 208 communicating via a bus 210. In some embodiments, server device 200 may be a part of e-commerce service provider device 104. In some embodiments, server device 200 may take the form of a specially programmed server or computing system used by e-commerce service provider device 104 to perform complete functions of e-commerce service provider device 104. In some embodiments, server device 200 may be configured as an apparatus, embedded system, dedicated circuit, or the like based on the storage, execution, and/or implementation of software instructions that perform one or more operations consistent with the disclosed embodiments.

Memory 202 may include one or more storage devices configured to store instructions used by processor 208 to perform functions related to disclosed embodiments. For example, memory 202 may be configured with one or more software instructions, such as program(s) 204 that may perform one or more operations when executed by processor 208. The disclosed embodiments are not limited to separate programs or computers configured to perform dedicated tasks. For example, memory 202 may include a single program 204 that performs the functions of server device 200, or program 204 may comprise multiple programs. In certain embodiments, memory 202 may store sets of instructions or programs 204 for performing functions of e-commerce service provider device 104. These sets of instructions may be executed by processor 208 to perform communication and/or processes consistent with disclosed embodiments.

In certain embodiments, when server device 200 constitutes one or more of the components of e-commerce service provider device 104, memory 202 includes programs 204. Programs 204 may include an authorization module 212, fraud detection module 214, and a web server module 216 as described in detail below.

In other embodiments, each of the authorization module 212, fraud detection module 214, and a web server module 216, may be implemented as separate and individual servers communicating with each other, and with database 106, inventory warehouse 110 and customer devices 102(1)-102(n), over communication network 108.

Web server module 216 provides e-commerce website communications between database 106 customer devices 102(1)-102(n), database 106 and inventory warehouse 110.

Input/output (I/O) 206 may include various input/output devices, such as a keyboard, a mouse-type device, a gesture sensor, an action sensor, a physical button, switch, microphone, touchscreen panel, stylus, etc., that may be manipulated by customer devices 102(1)-102(n). I/O devices 206 may also include an audio output device. Exemplary communication modules of I/O devices 206 may include, for example, a short-range or near field wireless communication modem, a Wi-Fi™ communication modem, or a cellular communication modem. I/O devices 206 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in server device 200 to exchange information with e-commerce service provider device 104, customer devices 102(1)-102(n), inventory warehouse 110 or database 106 via communication network 108.

Processor 208 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 100.

Figure 3:
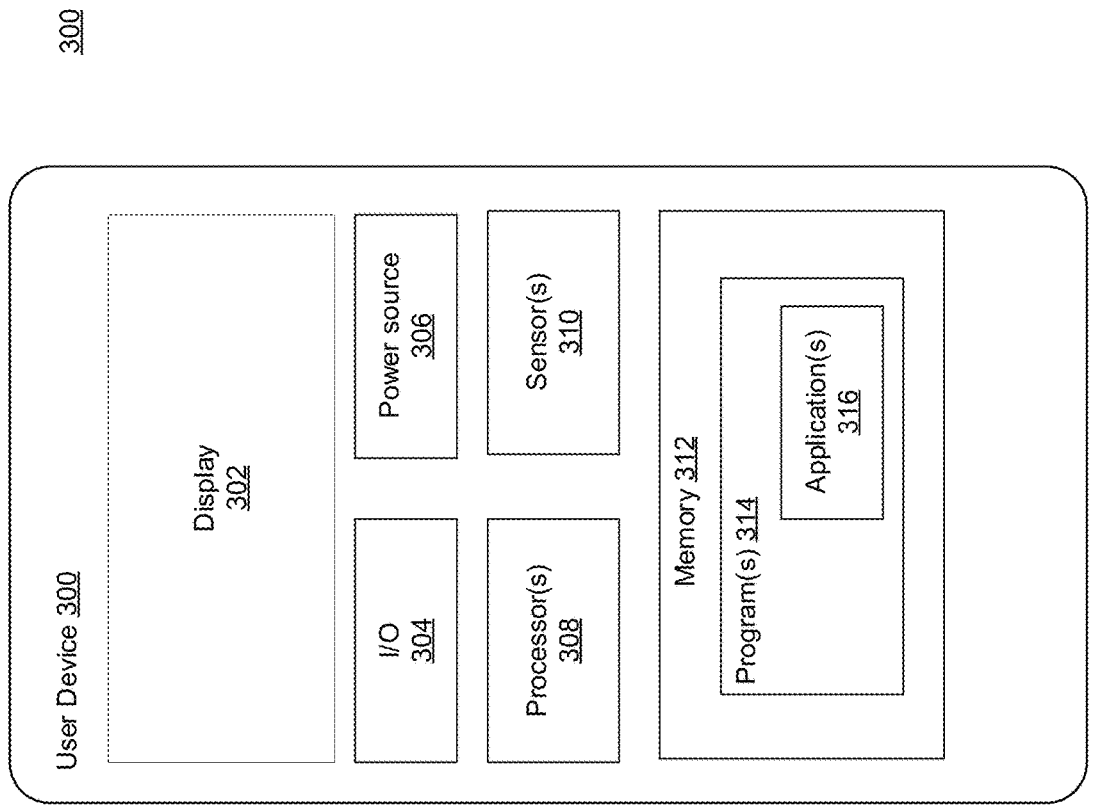
FIG. 3 is a block diagram of an exemplary user device, consistent with disclosed embodiments.

FIG. 3 shows an exemplary configuration of user device 300, consistent with disclosed embodiments. User device 300 of FIG. 3 represents an exemplary configuration of each of the customer devices 102(1)-102(n).

User device 300 may enable associated customers associated with customer devices 102(1)-102(n) to, for example, perform remote interactions or mobile transactions with e-commerce service provider device 104, or receive information from e-commerce service provider device 104. In some embodiments, user device 300 may be a personal computing device. For example, user device 300 may be a smartphone, a laptop or notebook computer, a tablet, a multifunctional watch, a pair of multifunctional glasses, or any mobile or wearable device with computing ability, or any combination of these computers and/or affiliated components.

User device 300 includes one or more processors 308 configured to execute software instructions stored in memory, such as a memory 312. Memory 312 may store one or more software programs 314 that when executed by processor 308 perform known Internet-related communication, content display processes, and other interactive processes for customers, drivers and/or merchants. For instance, user device 300 may execute a browser or related mobile display software that generates and displays interfaces including content on a display device 302 included in, or in communication with, user device 300. User device 300 may be a mobile device that executes mobile device applications and/or mobile device communication software, included in programs 314, that allows user device 300 to communicate with integration server system 116 and other components via communication network 108, to generate and display content in interfaces via display device 302. The disclosed embodiments are not limited to any particular configuration of user device 300. User device 300 may include any arrangement of one or more computing devices configured to perform one or more operations consistent with disclosed embodiments.

User device 300 may be configured to store, in memory 312, one or more operating systems that perform known operating system functions when executed by processor 308. By way of example, the operating systems may include Microsoft Windows™, Unix™, Linux™, Android™, Apple™ Mac OS operating systems, iOS, Chrome OS, or other types of operating systems. Accordingly, disclosed embodiments may operate and function with computer systems running any type of operating system. User device 300 may also include communication software stored in memory 312 that, when executed by processor 308, provides communications with communication network 108, such as Web browser software, tablet or smart handheld device networking software, etc.

Display device 302 may include, for example, a liquid crystal display (LCD), a light emitting diode screens (LED), an organic light emitting diode screen (OLED), a touch screen, and other known display devices. Display device 302 may display various information to customers, drivers and merchants. For example, display device 302 may display an interactive interface enabling customers, drivers and merchants to operate user device 300 to perform certain aspects of the disclosed methods. Display device 302 may display touchable or selectable options for customers, drivers and merchants to select and may receive customer selection of options through a touch screen.

User device 300 includes I/O devices 304 that allows to send and receive information or interact with customers or another device. For example, I/O devices 304 may include various input/output devices, such as a keyboard, a mouse-type device, a gesture sensor, an action sensor, a physical button, switch, microphone, touchscreen panel, stylus, etc., that may be manipulated by customers to input information using user device 300. I/O devices 304 may also include an audio output device, such as a speaker configured to provide sound and audio feedback to customers operating user device 300. In some embodiments, I/O devices 304 may include a light emitting component, such as a LED or other component capable of providing a visible signal to customers, drivers and merchants. I/O devices 304 may also include haptic output devices, to provide haptic feedback to customers. I/O devices 304 may also include one or more communication modules (not shown) for sending and receiving information from other components in system 100 by, for example, establishing wired or wireless connectivity between user device 300 and communication network 108. I/O devices 304 may include radio frequency, infrared, or other near-field communication interfaces, for communicating with other devices associated with communication network 108. Exemplary communication modules of I/O devices 304 may include, for example, a short-range or near field wireless communication modem, a Wi-Fi™ communication modem, or a cellular communication modem. I/O devices 304 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 300 to exchange information with e-commerce service provider device 104 or database 106 via communication network 108.

As described above, user device 300 may be a device that executes mobile applications for performing operations consistent with disclosed embodiments. Thus, in some embodiments, programs 314 stored on user device 300 may include one or more software applications 316 installed thereon, that enable user device 300 to communicate with e-commerce service provider device 104 via communication network 108 and perform aspects of the disclosed methods. For example, user device 300 may connect to e-commerce service provider device 104 by using browser software to access and receive information or perform other operations associated with an internet service provider.

According to an exemplary embodiment, software applications 316 associated with e-commerce service provider device 104 may be installed on user device 300, as shown in FIG. 3. For example, e-commerce service provider device 104 may receive a request from customer device 102(1) to download one or more software applications 316 to user customer device 102(1). In one embodiment, e-commerce service provider device 104 may receive the request from a customer associated with customer device 102(1), using a web browser application installed on customer device 102(1) respectively. In another embodiment, e-commerce service provider device 104 may receive the request to download one or more software applications 316 associated with e-commerce service provider device 104 onto customer device 102(1) from a webpage or another portal associated with e-commerce service provider device 104 accessed via, e.g., customer device 102(1). In this embodiment, e-commerce service provider device 104 may store software instructions corresponding to one or more software applications 316 in database 106. For responding to the download request, e-commerce service provider device 104 may receive additional information from customer device 102(1) regarding the particular device specifications of customer device 102(1) to enable customer device 102(1) to download software instructions corresponding to the particular specifications. Alternatively, e-commerce service provider device 104 may push a download request link to customer device 102(1) or transmit software code corresponding to one or more software applications 316 directly to customer device 102(1) in, for example, an e-mail, a text or short message service (SMS) message, a prompt through an app, or other suitable method. Customer device 102(1) may receive the software code related to one or more software applications 316, such as via communication network 108, to download and install the software code.

Figure 4A:
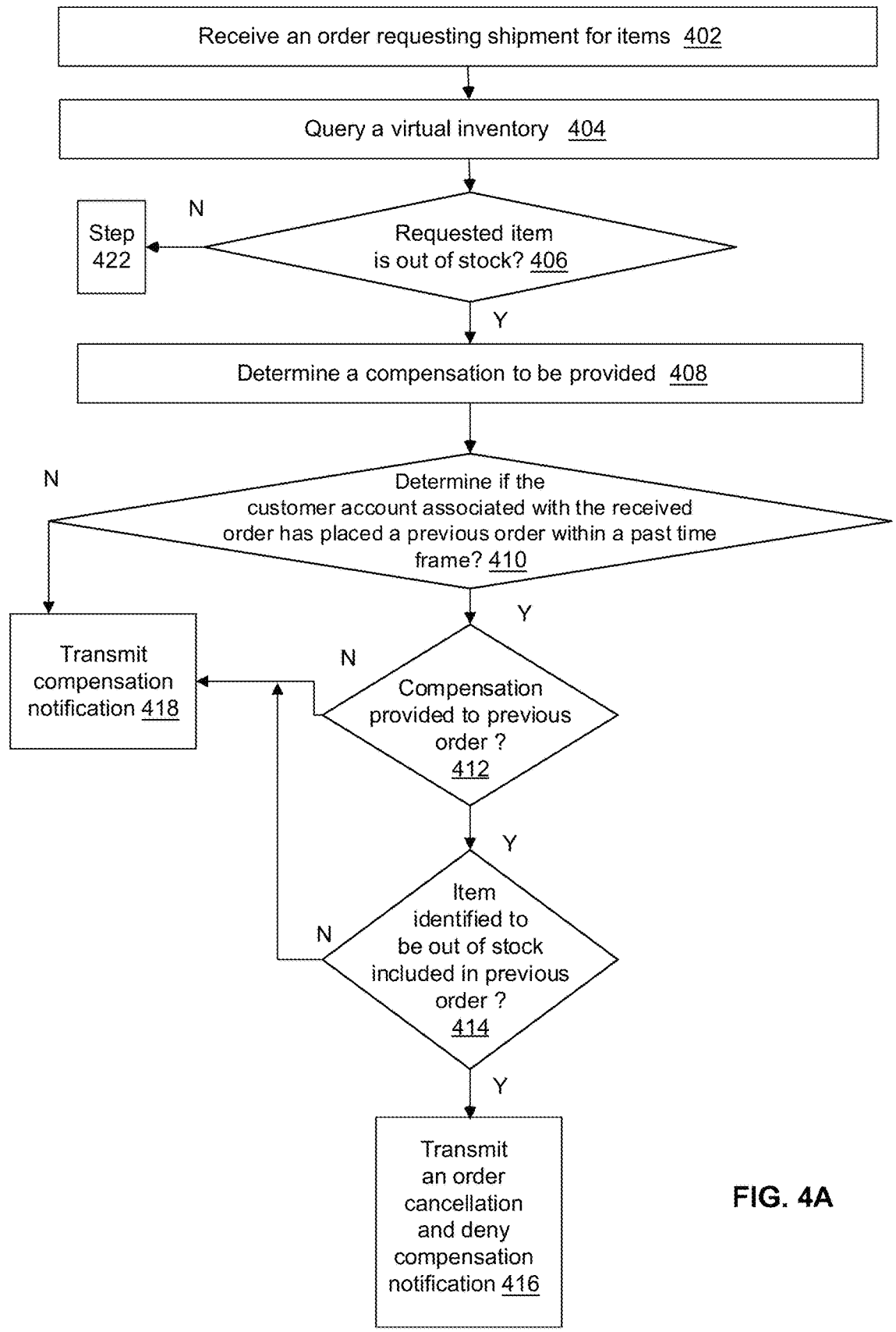
FIGS. 4A-4B contains a detailed flowchart of an exemplary process of fraud detection in e-commerce transactions, consistent with disclosed embodiments.
Figure 4B:
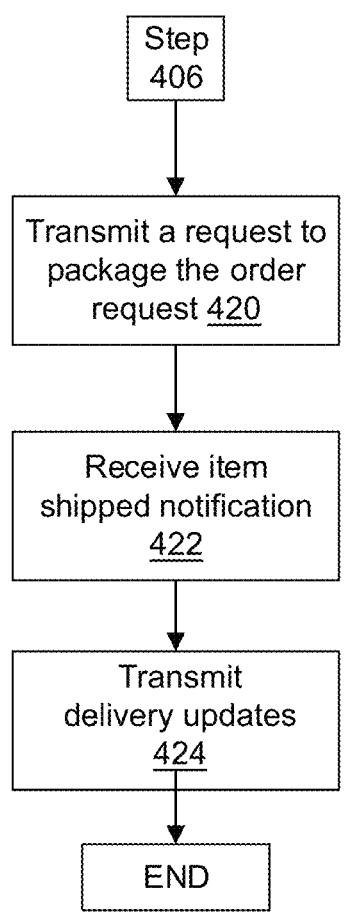

FIGS. 4A & 4B contain a flowchart of an exemplary process 400 implemented by e-commerce service provider device 104 for fraud detection in e-commerce transactions, consistent with the disclosed embodiments. E-commerce service provider device 104 is implemented as a server device 200 of FIG. 2 to execute software instructions that perform one or more of the operations of process 400.

In step 402, e-commerce service provider device 104 receives an order request from customer devices 102(1)-102(*n*). Received order request may include order information and customer information. Upon receiving order request, e-commerce service provider device 104 may transmit an order acceptance notification to the customer devices 102(1)-102(*n*) that placed the order.

Customer information may include customer account identifier, customer device identifier, customer mode of payment information, although any other customer information may also be included. Upon receiving order request from customer devices 102(1)-102(*n*) e-commerce service provider device 104 transmits an order acceptance notification to customer devices 102(1)-102(*n*), as an acknowledgment of servicing the ordered request.

Order information may include a history of past orders placed, compensation information, a list of items ordered by a customer associated with customer devices 102(1)-102(*n*), order shipping address, name of the items, quantity of items, date order request was placed, time order request was placed, order status information, stock-keeping unit (SKU) number associated with items requested in the order, although any other order information may also be included. History of past orders placed may include a date and/or time of the past orders, item SKU numbers purchased in the past order, etc., although any other past order information may also be included. Compensation information may include a history of past compensation received by the customer account, which may include date, time, amount, type of compensation received, or the like. Order status information may include a status of the order identifying if the order is accepted, packaged, shipped, and delivered. By way of example, items requested in the order request includes iPhone 8, and Nike Shoe 1. In this example, e-commerce service provider device 104 identifies SKU number associated with item iPhone 8, and item Nike Shoe 1 and stores it in memory 202.

Customer account identifier (ID) may include customer name, customer address, customer phone number, customer account number, customer username, and customer email address, although any other customer identifier for an order may also be included. Customer mode of payment information may include last four digits of debit card number, credit card number and/or bank account number utilized to place the order request.

Customer device identifier may be an identifier associated with customer devices 102(1)-102(*n*). By way of example, customer device identifier may include internet protocol (IP) address associated with customer devices 102(1)-102(*n*), and/or memory access control (MAC) address associated with customer devices 102(1)-102(*n*), although any other device identifier may also be included. E-commerce service provider device 104 stores pre-configured algorithms in memory 202 to determine customer device identifier of IP address by parsing an IP packet header information. IP packet may be an IPv4 packet structure or IPv6 packet structure. IPv4 packet header consist an IP address associated customer devices 102(1)-102(*n*) transmitting the order request. E-commerce service provider device 104 parses the IP header information and determines the IP address of customer devices 102(1)-102(*n*). Similarly, e-commerce service provider device 104 determines customer device identifier by parsing an IP frame header information. IP Frame header may include MAC address associated customer devices 102(1)-102(*n*) transmitting the order request. E-commerce service provider device 104 parses the frame header information and determines the MAC address of customer devices 102(1)-102(*n*).

In step 404, e-commerce service provider device 104 queries a virtual inventory to determine if the items requested in the order request are included in the virtual inventory. In some embodiments, the virtual inventory may be stored in database 106 or in memory 202. Virtual inventory includes an inventory of items associated with their SKU numbers that are available at inventory warehouse 110 of an e-commerce website and the quantity of each of the items. Inventory warehouse 110 is a storage facility location where items sold by e-commerce website are stored. In this step, e-commerce service provider device 104 transmits a query request to a database 106 to access the virtual inventory stored at database 106. Virtual inventory stores data of all the available items and the quantity of each of the items present at inventory warehouse 110. Data of all the available items and the quantity of each of the items stored at inventory warehouse 110 may be updated periodically by a service personnel present at the inventory warehouse 110. For example, a worker at inventory warehouse 110 may utilize a mobile device (not pictured) to scan a barcode or other identification tag affixed to, attached to, or associated with an item. The mobile device, in response, may instantiate and forward a "scan event" (e.g., a communication) to database 106 that comprises an identifier that is part of the barcode or tag, a timestamp (including time and date), an action (e.g., placing the item on a shelf for later picking, picking the item from the shelf for fulfillment, moving the item to another shelf, or the like), a user or mobile device identifier, location information (e.g., GPS data), or the like. Database 106 may receive and store the information in the scan event to enable a determination of where each item in inventory warehouse is at each time.

By way of example, fraud detection module 214 transmits a query request to database 106. Fraud detection module 214 may be programmed to transmit the query request at pre-defined time intervals, based on preconfigured instructions by a system administrator or in response to receiving an order request. Exemplary pre-defined time intervals may include 1 minute, 5 minutes or 1 hour, although any other time period and combinations of time period may also be allocated. In another example, fraud detection module 214 may be programmed to transmit the query request in response to a user input received from a system administrator by utilizing a user device 300. Virtual inventory stores a list of items that are available in an inventory warehouse 110 of an e-commerce website and the quantity of each of the items.

In step 406, e-commerce service provider device 104 determines if the items requested in the order received in step 402 are included in the virtual inventory queried in step 404. By way of example, as the items requested in the order request includes iPhone 8, and Nike Shoe 1, e-commerce service provider device 104 determines if the SKU numbers associated with the requested items are included in the virtual inventory that includes a list of SKU numbers associated with all the items available at inventory warehouse 110.

In this example, when virtual inventory includes list of SKU numbers associated with iPhone X, iPhone 7, and Adidas Shoe 1, e-commerce service provider device 104 determines that the SKU numbers associated the item iPhone 8, and Nike Shoe 1 requested in the order request is not included in the list of SKU numbers stored in virtual inventory. Upon determining that the items requested in the order request are not included in the virtual inventory, e-commerce service provider device 104 determines that the item iPhone 8, and Nike Shoe 1 are out of stock and is not available at the inventory warehouse 110 and takes the Yes branch and proceeds to step 408.

In step 408, e-commerce service provider device 104 determines a compensation to be provided to customer accounts associated with order requests that include out of stock items. Compensation may be a monetary reward, such as, a $5 cash back, or 10$ cash back, etc., although any other number of monetary reward may also be provided. Compensation may also include coupons such as, 10% discount on future purchases, although any other type of coupons may also be provided. In another example, compensation may be provided based on the total cost of the items purchased in the order. By way of example, compensation may be 10% of the total cost of the items purchased on the order or for orders that have a total cost of in range of $0-$100 then compensation may be $10, for orders that have a total cost in range of $101-$500, although any other types of compensation may also be provided. In another embodiment, this step 408 may also be performed before the step 418.

In step 410, e-commerce service provider device 104 determines if the customer account associated with the requested order has placed previous orders within a past time frame based on customer account identifier. Past time frame may include past 1 minute, past 5 minutes, or past 1 hour, although any other time frame may also be included. E-commerce service provider device 104 utilizes the customer account identifier (e.g. customer name, customer address, customer phone number, customer account number, customer username, and customer email address, etc.) determined in step 402 to access a history of past orders placed by the account associated with the customer account identifier within a past time frame. When e-commerce service provider device 104 determines that the customer account associated with the requested order has placed previous orders within a past time frame then the method proceeds to take the Yes branch to step 412. By way of example, when the past time frame is 15 minutes, and when e-commerce service provider device 104 determines that the customer account associated with the requested order has placed a previous order (e.g. order placed 10 minutes before placing the order to request items received in step 402) then the previous order is within the past time frame of 15 minutes and the method proceeds to take the Yes branch to step 412.

In another embodiment, e-commerce service provider device 104 determines if the customer account associated with the requested order has placed previous orders within a past time frame based on customer device identifier (e.g. an internet protocol (IP) address associated with customer devices 102(1)-102(n), and/or memory access control (MAC) address associated with customer devices 102(1)-102(n), etc.). E-commerce service provider device 104 accesses an order lookup table stored in memory 202 to determine if the customer account identifier matches with a past order. An order lookup table is a lookup table stored in database 106 that includes a list of orders placed in the past time frame associated with corresponding customer device identifiers for customer devices 102(1)-102(n) that placed the order. Upon identifying a match in the order lookup table e-commerce service provider device 104 determines if the customer account associated with the requested order has placed previous orders within a past time frame.

In step 412, e-commerce service provider device 104 determines whether the customer was compensated for the previous orders determined in step 410. E-commerce service provider device 104 accesses compensation information (e.g. a history of past compensations received by the customer account, which may include date, time, amount and/or type of compensation received, etc.) included in the customer account to determine if the previous orders has been issued a compensation. When e-commerce service provider device 104 determines that the customer was compensated for the previous order has been issued a compensation, then the method proceeds to take the Yes branch to step 414. By way of example, when the e-commerce service provider device 104 determines that the customer was compensated for the previous order received a compensation (e.g. $5 cash back to their account) then the method proceeds to take the Yes branch to step 414.

In step 414, e-commerce service provider device 104 determines if items included in previous order are items identified to be out of stock in step 406. By way of example, e-commerce service provider device 104 determines that the previous order includes SKU numbers associated with items iPhone 8, and Nike Shoe 1 as well as the items identified in step 406 to be out of stock also includes SKU numbers associated with items iPhone 8, and Nike Shoe 1, as a result e-commerce service provider device 104 determines that items identified as out of stock in step 406 are included in the previous order, and the method takes the yes branch to step 416.

In step 416, e-commerce service provider device 104 determines that as a compensation had already been provided to the customer account associated with the order request, thus another compensation is not to be provided to the customer account associated with the order request. E-commerce service provider device 104 transmits a cancel order and deny compensation notification message to the customer devices 102(1)-102(n) associated with the order request via email (e.g. to an e-mail address associated with the customer stored in the customer account) and/or text message (e.g. to a phone number associated with the customer stored in the customer account), although any other communication medium may be utilized to transmit the notification to the customer devices 102(1)-102(n). Deny compensation notification message comprises a message such as, "Your ordered items have been cancelled," or "Your order has been cancelled. As a compensation was provided to your account recently, you will not receive compensation."

In another embodiment, back in step 406 when there are multiple items requested in a received order, and in step 406 e-commerce service provider device 104 may determine that a few of the items are out of stock and while the remaining items requested in received order are available at inventory warehouse 110 and are not out of stock. another one of the items. In such a situation, e-commerce service provider device 104 may proceeds to perform operations of steps 406-418 for items determined to be out of stock and at the same time e-commerce service provider device 104 may proceed to perform operations of steps 420-424 (in FIG. 4B) for the items determined to be available at inventory warehouse 110 and are not out of stock.

Back in step 406, in this example, when virtual inventory includes list of SKU numbers associated with iPhone X, iPhone 8, and Nike Shoe 1, e-commerce service provider device 104 determines that the SKU numbers associated the items requested in the order request that includes iPhone 8, and Nike Shoe 1 are included in the list of SKU numbers stored in virtual inventory. Upon determining that items requested in the order request are included in the second list of items e-commerce service provider device 104 determines that the items requested in the order are available at the inventory warehouse 110 and are not out of stock and takes the No branch and proceeds to step 420.

In step 420, e-commerce service provider device 104 determines to transmits a request to inventory warehouse 110 to package the items requested in the online order request. the request transmitted include order information (e.g. order shipping address and SKU number associated with requested items, etc.) and customer information (customer account number and/or name, etc.).

In step 422, e-commerce service provider device 104 receives an item shipped notification from inventory warehouse 110. Item shipped notification is a notification that indicates that available items requested by the online order request are shipped from inventory warehouse 110.

In step 424, e-commerce service provider device 104 transmits delivery updates notifications to customer devices 102(1)-102(n). E-commerce service provider device 104 transmits delivery updates notifications to the customer devices 102(1)-102(n) associated with the order request via email (e.g. to an e-mail address associated with the customer stored in the customer account) and/or text message (e.g. to a phone number associated with the customer stored in the customer account), although any other communication medium may be utilized to transmit the notification to the customer devices 102(1)-102(n). Delivery update notifications includes delivery status of shipped items, which includes shipped, on the way, delivered, etc., although any other type of delivery update may also be included.

When back in step 410, e-commerce service provider device 104 determines that the customer account associated with the requested order has not placed previous orders within a past time frame then the method proceeds to take the No branch to step 418.

By way of example, back in step 412 when the past time frame is 15 minutes, and when e-commerce service provider device 104 determines that the previous order received did not received a compensation then the method proceeds to take the No branch to step 418.

By way of example, back in step 414 when e-commerce service provider device 104 determines that the previous order includes SKU numbers associated with items iPhone 6, and Puma Shoe 1 and the items identified in step 406 to be out of stock includes SKU numbers associated with items iPhone 8, and Nike Shoe 1 then the e-commerce service provider device 104 determines that items identified as out of stock in step 406 are not included in the previous order, and the method takes the no branch to step 418.

In step 418, e-commerce service provider device 104 determines that as a compensation has not been provided to the customer account associated with the online order request, thus e-commerce service provider device 104 transmits compensation notification message to the customer devices 102(1)-102(n) associated with the online order request to transmit the compensation determined in step 408. Compensation notification message is a message, such as, "You have been provided a compensation of $5, because the item you requested in out of stock." E-commerce service provider device 104 transmits compensation notification message to the customer devices 102(1)-102(n) associated with the order request via email (e.g. to an e-mail address associated with the customer stored in the customer account) and/or text message (e.g. to a phone number associated with the customer stored in the customer account), although any other communication medium may be utilized to transmit the notification to the customer devices 102(1)-102(n).

The disclosed embodiments provide an improved method of fraud detection in e-commerce transactions. By providing technical advantages of an optimized process of reducing fraudulent e-commerce activities. As this technology provides a system to determine if a customer has already been provided a compensation for an order and denying further compensations, this technology provides a fast and reliable process of reducing fraud, which results in optimizing the utilization of resources for genuine customer order. Further, as this technology identifies an IP address and/or a MAC address associated with a customer device by parsing the online order request, this technology provides an optimized process of determining fraudulent customers that would use different customer accounts to transmit multiple online order requests to make low in stock items go out of stock in a short period time frame and thus to receive multiple compensations. Thus, this technology reduces data overhead and resources, by not processing online order requests from fraudulent customers, which requires extra data overhead and resources.

In contrast, in the prior art, other strategies that have been implemented are inefficient as they require extra data overhead, which may not be beneficial to efficiently utilize network resources and thus increase network load and reduce utilization of resources. Further the prior art causes significant economic losses for processing of fraudulent requests, while the disclosed embodiments provides a fraud detection process, that reduces frauds.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

The invention claimed is:

1. A computer-implemented system for fraud detection, the system comprising:
   a memory storing instructions; and
   at least one processor configured to execute the instructions to:
      receive, over a network, a first order comprising an item identifier and a customer identifier from a customer device;
      parse the received first order to identify a customer device identifier associated with the customer device, the customer device identifier comprising at least one of an Internet protocol (IP) address or a memory access control (MAC) address;
      consult at least one database to determine if an item associated with the item identifier is included in a virtual inventory, the virtual inventory representing an inventory of items, each having an associated item identifier, available at an inventory warehouse;
      based on the item not being included in the virtual inventory, determine the item is out of stock;
      based on determining the item is out of stock, consult the at least one database to determine if a customer account associated with at least one of the customer identifier or the customer device identifier placed a second order earlier than the first order within a time frame;
      based on determining the customer account placed the second order earlier than the first order within the time frame, determine whether compensation was provided to the customer account associated with the at least one of the customer identifier or the customer device identifier; and
      based on determining the compensation was provided to the customer account, transmit an order cancellation notification to the customer device.

2. The system of claim 1, wherein the customer identifier comprises at least one of a customer name, customer address, customer phone number or customer email address.

3. The system of claim 1, wherein the instructions further cause the processor to:
   based on determining the item is not out of stock, transmit a request to a mobile device associated with the inventory warehouse to package the item.

4. The system of claim 1, wherein the received order comprises the customer device identifier.

5. The system of claim 1, wherein the processor is further configured to:
   based on determining the customer account did not place the second order earlier than the first order within the time frame, transmit a compensation notification to the customer device.

6. The system of claim 1, wherein the processor is further configured to:
   based on determining the compensation was not provided to the customer account, transmit a compensation notification to the customer device.

7. The system of claim 1, wherein the processor is further configured to:
   determine whether the second order comprises the item identifier associated with the item; and
   based on determining the second order does not comprise the item, transmit a compensation notification to the customer device.

8. A computer implemented method for fraud detection, the method performed by one or more processors, comprising:
   receiving, over a network, a first order comprising an item identifier and a customer identifier from a customer device;
   parsing the received first order to identify a customer device identifier associated with the customer device, the customer device identifier comprising at least one of an Internet protocol (IP) address or a memory access control (MAC) address;
   consulting at least one database to determine if an item associated with the item identifier is included in a virtual inventory, the virtual inventory representing an inventory of items, each having an associated item identifier, available at an inventory warehouse;
   based on the item not being included in the virtual inventory, determining the item is out of stock;
   based on determining the item is out of stock, consulting the at least one database to determine if a customer account associated with at least one of the customer identifier or the customer device identifier placed a second order earlier than the first order within a time frame;
   based on determining the customer account placed the second order earlier than the first order within the time frame, determining whether compensation was provided to the customer account associated with the at least one of the customer identifier or the customer device identifier; and
   based on determining the compensation was provided to the customer account, transmitting an order cancellation notification to the customer device.

9. The method of claim 8, wherein the customer identifier comprises at least one of a customer name, customer address, customer phone number or customer email address.

10. The method of claim 8, further comprising:
    based on determining the item is not out of stock, transmitting a request to a mobile device associated with the inventory warehouse to package the item.

11. The method of claim 8, wherein the received order comprises the customer device identifier.

12. The method of claim 8, further comprising:
    based on determining the customer account did not place the second order earlier than the first order within the time frame, transmitting a compensation notification to the customer device.

13. The method of claim 8, further comprising:
    based on determining the compensation was not provided to the customer account, transmitting a compensation notification to the customer device.

14. The method of claim 8, further comprising:
    determining whether the second order comprises the item identifier associated with the item; and
    based on determining the second order does not comprise the item, transmitting a compensation notification to the customer device.

15. A computer-implemented system for fraud detection, the system comprising:
- a memory storing instructions; and
- at least one processor configured to execute the instructions to:
  - receive, over a network, a first order comprising an item identifier and a customer identifier from a customer device;
  - parse the received first order to identify the customer device identifier associated with the customer device, the customer device identifier comprising at least one of an Internet protocol (IP) address or a memory access control (MAC) address;
  - consult at least one database to determine if an item associated with the item identifier is included in a virtual inventory, the virtual inventory representing an inventory of items, each having an associated item identifier, available at an inventory warehouse;
  - based on the item not being included in the virtual inventory, determine the item is out of stock;
  - based on determining that the item is out of stock, consult the at least one database to determine if a customer account associated with at least one of the customer identifier or the customer device identifier placed a second order earlier than the first order within a time frame;
  - based on determining the customer account placed the second order earlier than the first order within the time frame, determine whether compensation was provided to the customer account associated with the at least one of the customer identifier or the customer device identifier;
  - based on determining the compensation was provided to the customer account, determine whether the second order comprises the item identifier associated with the item; and
  - upon determining the second order comprises the item identifier, transmit an order cancellation notification to the customer device.

16. The computer-implemented system of claim 15, wherein the customer identifier comprises at least one of a customer name, customer address, customer phone number or customer email address.

17. The computer-implemented system of claim 15, wherein the received order comprises the customer device identifier, the customer device identifier comprising at least one of the internet protocol (IP) address or the memory access control (MAC) address.

18. The system of claim 15, wherein the processor is further configured to:
- based on determining the item is not out of stock, transmit a request to a mobile device associated with the inventory warehouse to package the item.

19. The system of claim 15, wherein the processor is further configured to:
- based on determining the customer account did not place the second order earlier than the first order within the time frame, transmit a compensation notification to the customer device.

20. The system of claim 15, wherein the processor is further configured to:
- based on determining the compensation was not provided to the customer account, transmit a compensation notification to the customer device.

* * * * *